United States Patent [19]

Nishimura et al.

[11] Patent Number: 5,347,371
[45] Date of Patent: Sep. 13, 1994

[54] VIDEO CAMERA WITH EXTRACTION UNIT FOR EXTRACTING SPECIFIC PORTION OF VIDEO SIGNAL

[75] Inventors: Ryuji Nishimura, Yokohama; Akihito Nishizawa, Yokosuka; Mayuko Yamamoto, Fujisawa; Takuya Imaide, Yokohama, all of Japan

[73] Assignee: Hitachi, Ltd., Tokyo, Japan

[21] Appl. No.: 940,348

[22] Filed: Sep. 3, 1992

Related U.S. Application Data

[63] Continuation-in-part of Ser. No. 798,892, Nov. 27, 1991, Pat. No. 5,293,255.

[30] Foreign Application Priority Data

Sep. 3, 1991 [JP] Japan .................................. 3-248485

[51] Int. Cl.⁵ ............................................. H04N 5/232
[52] U.S. Cl. ................................. 358/453; 348/228; 348/349; 348/222
[58] Field of Search ........................ 358/227-228, 358/224, 209, 213.13, 213.19, 453

[56] References Cited

U.S. PATENT DOCUMENTS

| | | | |
|---|---|---|---|
| 4,535,364 | 8/1985 | Hirobe | 358/228 |
| 4,701,782 | 10/1987 | Duvent | 358/227 |
| 4,789,898 | 12/1988 | Zwirn et al. | 358/227 |
| 4,794,459 | 12/1988 | Moberg et al. | 358/227 |
| 4,829,382 | 5/1989 | Hess et al. | 358/228 |

Primary Examiner—Stephen Brinich
Attorney, Agent, or Firm—Antonelli, Terry, Stout & Kraus

[57] ABSTRACT

A video camera for enabling improvement in automatic functions such as automatic white balancing and automatic focusing while controlling picture quality of a video image including a specific object of the video image and/or background thereof. The video camera includes an image pickup device and a signal processing circuit responsive thereto for processing the image picked up by the image pickup device and providing a video signal as an output. An extraction unit is provided for extracting a signal representative of a specific portion of the video signal of the signal processing circuit, and a control unit responsive to the signal extracted by the extraction unit effects control of at least one of the signal processing circuit and at least one input control parameter of the video camera in accordance therewith, thereby providing improvement in the picture quality.

22 Claims, 7 Drawing Sheets

VIDEO CAMERA WITH EXTRACTION UNIT FOR EXTRACTING SPECIFIC PORTION OF VIDEO SIGNAL

CROSS REFERENCE TO RELATED APPLICATIONS

The present invention is a Continuation-in-Part application of U.S. application Ser. No. 798,892, filed Nov. 27, 1991, now U.S. Pat. No. 5,293,255, issued Mar. 8, 1994, the subject matter of which is incorporated by reference herein.

FIELD OF THE INVENTION

The present invention relates to a video camera having automatic functions such as special shooting, automatic white balancing, and automatic exposure controlling functions.

BACKGROUND OF THE INVENTION

With rapid development of video cameras and video movies integrated with VTR, interests of users are being diversified and many people are now making individual videos. Accordingly, various functions with which free video presentations can be achieved have come to be demanded of video cameras. As one of such functions, there is a professional AE system using a variable electronic shutter as reported in the Record of the Institute of Television Engineers, Vol. 14, No. 16 (1990) pp. 1–6. In this system, since the depth of field can be selected as in a single lens reflex camera, it is possible to produce a portrait effect by keeping only an object in focus and rendering the background out of focus or to keep objects, ranging from that which is close to the camera to that which is away from the camera, in focus by setting the depth of field greater.

On the other hand, general users are demanding video cameras having good operability, ease of handling and yet being capable of taking beautiful pictures. Accordingly, various automatic functions such as automatic white balancing and automatic focusing functions are frequently mounted on video cameras as reported in the Record of the Institute of Television Engineers, Vol. 14, No. 16 (1990) pp. 13–18 or The Institute of Television Engineers, Advance Copy of National Convention (1990) pp. 21–24.

In the professional AE system, however, only the function to render the background out of focus or the like are achievable and processing for colors, for example, is not achievable. Further, the degree of freedom in selecting the value of the stop or the speed of the shutter greatly depends on the illuminance of the surrounding of the object and, hence, there has been a problem that such functions cannot be satisfactorily achieved when the illuminance is low.

Although the above described automatic functions for white balancing or the like can be performed to a certain degree, it is difficult to have the functions achieved to such a high level as achieved by a skilled user through manual adjustments with conditions of the object and the surroundings taken into consideration. In order to improve automatic functions to such a high level, the camera itself must be able to recognize what the object is to a certain degree, but conventional cameras have not had such a function.

SUMMARY OF INVENTION

An object of the present invention is to provide a video camera whereby the above mentioned problems are solved and new functions for video representation can be achieved, such as making a portrait in which the background of the object is rendered out of focus, correcting the color of the object to make it look more beautiful, and others, irrespective of conditions such as illuminance.

Another object of the present invention is to provide a video camera wherein automatic functions such as automatic white balancing and automatic focusing functions are improved.

A further object of the present invention is to provide a video camera made so intelligent as to recognize what the object is to a certain degree.

To achieve the above mentioned objects, the present invention provides that an output signal of an image pickup device processed in a signal processing circuit is converted into a video signal, an extraction unit extracts a portion of a specific object from the video signal output from the signal processing circuit, and a control unit, in response to the extracted output by the extraction unit, controls signal processing parameters in the signal processing circuit for processing the portion of the specific object and a portion other than that, separately.

According to another feature of the present invention, when the output signal of the image pickup device is processed by a signal processing circuit and converted to a video signal and the extraction unit extracts a portion of a specific object from the video signal, there is provided a recognition unit for recognizing the object from the portion of the specific object extracted by the extraction unit, and the control unit controls the signal processing circuit in accordance with the result of recognition performed by the recognition unit.

According to a further feature of the present invention, when an output signal of an image pickup device processed in a signal processing circuit is converted into a video signal, there is provided a control unit for controlling the signal processing circuit, an extraction unit for extracting the portion of a specific object from the video signal output from the signal processing circuit, a recognition unit for recognizing the object from the portion of the specific object extracted by the extraction unit, and an output unit for outputting the result of recognition performed by the recognition unit.

In accordance with the present invention, a video signal output from the signal processing circuit is supplied to the extraction unit and, therein, a signal representative of a specific object such as a person (hereinafter called a specific-object signal) is detected from the video signal. The control unit for controlling parameters such as frequency characteristics, degrees of amplification, and color hues of the video signal in the signal processing circuit, is adapted, in response to the output of the extraction unit, to control the processing parameters in the signal processing circuit so that frequency characteristics, degrees of amplification, color hues, etc. which are different between the portion of the specific object and other portion than that in the video signal may be obtained. Thereby, a portrait effect to have the object contrasted with the background or a function correcting the color of skin of a person without affecting the color of the background can be obtained.

The recognition unit, in accordance with the specific-object signal extracted by the extraction unit, recognizes what the specific object is and controls the processing parameters in the signal processing circuit according to the result of recognition. Thereby, an optimum picture quality can be obtained for the recognized object.

The result of the recognition performed by the recognition unit can be supplied to a desired display means and, thereby, what the specific object according to the specific-object signal extracted by the extraction means is can be displayed in the form of a video image, characters, voice, etc.

These and further objects, features and advantages of the present invention will become more obvious from the following description when taken in connection with the accompanying drawings which show for purposes of illustration only, several embodiments in accordance with the present invention.

DESCRIPTION OF THE PREFERRED EMBODIMENTS

Figure 1:
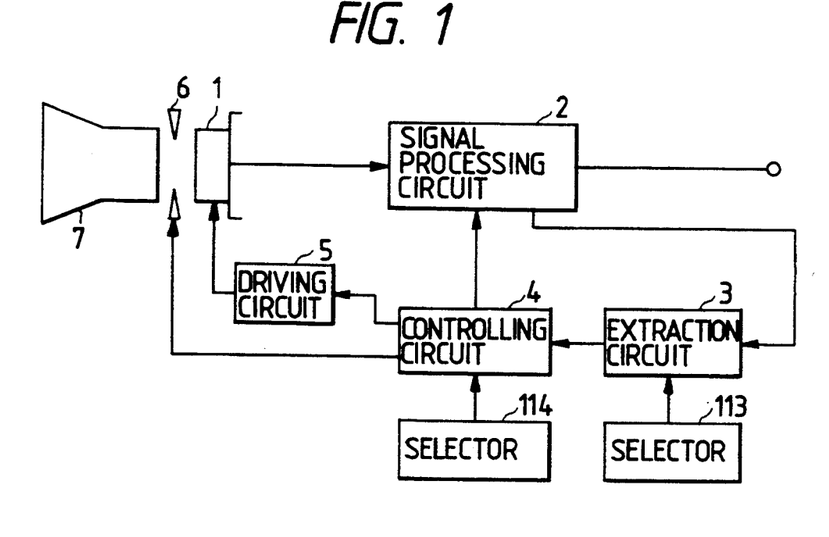
FIG. 1 is a block diagram showing an embodiment of a video camera according to the present invention.

Referring now to the drawings wherein like numerals are utilized to designate like parts throughout the several view, FIG. 1 is a block diagram showing an embodiment of a video camera according to the present invention including an image pickup device 1, a signal processing circuit 2, an object extraction circuit 3, a selector 113, a controlling circuit 4, a selector 114, a driving circuit 5, an iris 6, a lens 7.

Figure 2A:
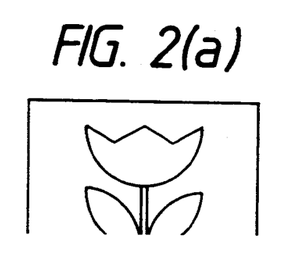
FIG. 2(a)-2(c) illustrate the operation of FIG. 1.
Figure 2B:
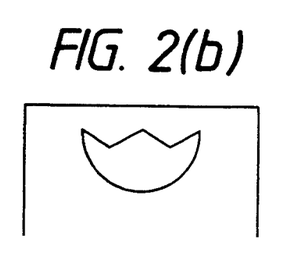

Referring to FIGS. 1 and 2(a)-(c), light passing through the lens 7 and iris 6 is photoelectrically converted by the image pickup device 1 and, thereby, an electric signal is output from the image pickup device 1. The electric signal is supplied to the signal processing circuit 2 to receive such treatments as a gamma correction and, thereby, a video signal is obtained. The video signal is output to the outside and also supplied to the object extraction circuit 3 and has an image output including, for example, an image of a flower as shown in FIG. 2(a). The object extraction circuit 3, which is provided for extracting a predetermined targeted object (specific object), extracts the portion representing the specific object (specific-object signal) from the incoming video signal and supplies it to the controlling circuit 4 in accordance with extraction parameters supplied by the selector 113. FIG. 2 illustrates the extracted object as being the petal portion of the flower, which extracted image portion is supplied to the controller circuit 4.

Figure 2C:
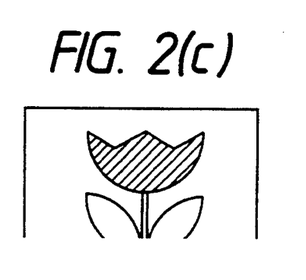

The controlling circuit 4, in response to the specific-object signal, functions to control the gain, black level, frequency characteristic, hue, etc. of the video signal in the signal processing circuit 2, and also to control the driving circuit 5 and the iris 6 in accordance with control parameters supplied by the selector 114. For example, the controlling circuit 4 modifies the hue of the petal image so that the output image of the signal processing circuit 2 then appears as modified as indicated by the hatching of the petal in the outputted flower image as shown in FIG. 2(c). By the control, such effects on the screen can be obtained that a portion other than the targeted object is rendered out of focus, the targeted specific object is rendered out of focus, the targeted specific object is enhanced, the color of the targeted specific object is changed, and the signal level of the targeted specific object is changed, irrespective of such conditions as illuminance. Further, the white balance of the targeted specific object is corrected, and thereby, an automatic white balancing performance can be improved, and furthermore, the driving circuit 5 controls the electronic shutter and the iris 6 controls the stop according to the targeted specific object and, thereby, an optimum depth of field can be automatically set up.

Figure 3:
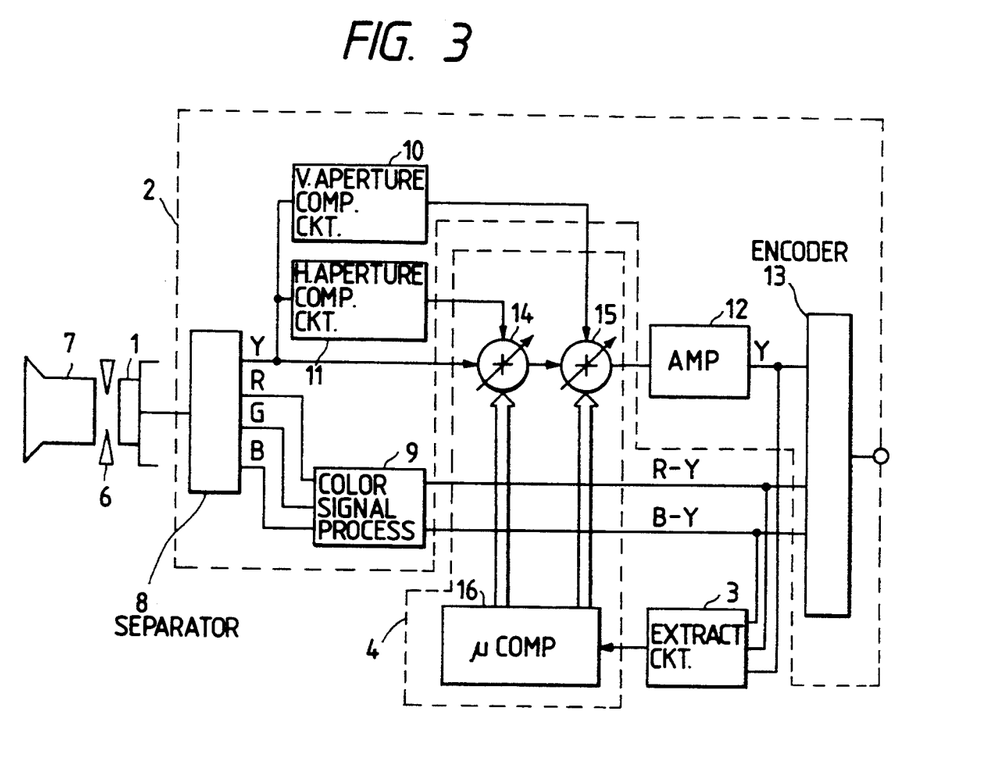
FIG. 3 is a block diagram showing a particular example of a signal processing circuit and a controlling circuit in FIG. 1.

FIG. 3 is a block diagram showing a particular example of the signal processing circuit 2 and controlling circuit 4 in FIG. 1, wherein the signal processing circuit 2 includes a separating circuit 8, a color signal processing circuit 9, a vertical aperture compensation circuit 10, a horizontal aperture compensation circuit 11, an amplifier 12, and an encoder circuit 13. The controlling circuit 4 includes a microcomputer 16 and adders 14 and 15.

In the signal processing circuit 2, the output signal of the image pickup device 1 is supplied to the separating circuit 8 and the output signal is separated into a luminance signal Y, a R (red) signal, a G (green) signal, and a B (blue) signal. The luminance signal Y is supplied to the vertical aperture compensation circuit 10, the horizontal aperture compensation circuit 11, and the adder 14 of the controlling circuit 4. In the vertical aperture compensation circuit 10, a vertical aperture compensation signal is generated from the supplied luminance signal Y and this signal is supplied to the adder 15. In the horizontal aperture compensation circuit 11, a horizontal aperture compensation signal is generated from the supplied luminance signal Y and this signal is supplied to the adder 14. The combining ratio of the luminance signal Y and the horizontal aperture compensation signal in the adder 14 is controlled by the microcomputer 16 and the combining ratio of the luminance signal Y output from the adder 14 and the vertical aperture compensation signal in the adder 15 is similarly controlled by the microcomputer 16. Thus, the luminance signal Y having passed through the horizontal and vertical aperture compensation is output from the adder 15 and this signal is amplified by the amplifier 12 and supplied to the encoder circuit 13. Meanwhile, the R (red) signal, G (green) signal, and B (blue) signal output from the separating circuit 8 are supplied to the color signal processing circuit 9 and color-difference signals R-Y and B-Y are generated therein and these signals are supplied to the encoder circuit 13. The encoder circuit 13 generates a color video signal from the luminance signal Y and color-difference signals R-Y and B-Y and supplies the signal to the outside.

The luminance signal Y amplified by the amplifier 12 and the color difference signals R-Y and B-Y output from the color signal processing circuit 9 are also supplied to the object extraction circuit 3. The object extraction circuit 3 extracts a specific-object signal representative of the specific object within the luminance signal Y and the color-difference signals R-Y and B-Y according to the level of the luminance signal Y and the level ratio between the color difference signals R-Y and B-Y, etc. and supplies the specific-object signal to the microcomputer 16 of the controlling circuit 4. The microcomputer 16 controls the combining ratios in each of the adders 14 and 15 in accordance with the specific-object signal. As is apparent, different settings of the extraction unit 3 and the microcomputer 16 are set in a known manner by the units 113 and 114.

Since, in this manner, aperture compensation amounts of the luminance signal Y are partly varied according to the specific object, such effects on the screen so as to render portions other than the targeted specific object out of focus or to render the targeted specific object out of focus can be attained irrespective of such conditions as illuminance.

Figure 4:
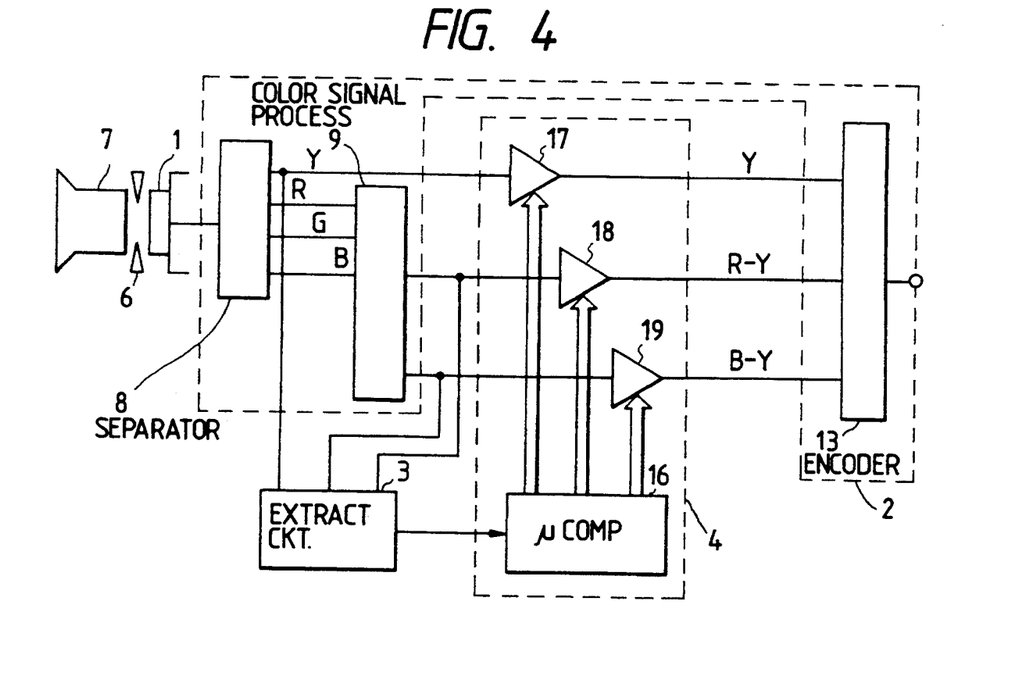
FIG. 4 is a block diagram showing another embodiment of a video camera according to the present invention.

FIG. 4 is a block diagram showing another embodiment of a video camera according to the present invention. Reference numerals 17 to 19 denote variable-gain amplifiers. In FIG. 4, the signal processing circuit 2 comprises the separating circuit 8, color signal processing circuit 9, and encoder circuit 13, and the controlling circuit 4 comprises the microcomputer 16 and variable-gain amplifiers 17 to 19. The luminance signal Y output from the separating circuit 8 is controlled for gain in the variable-gain amplifier 17 and supplied to the encoder circuit 13, while color-difference signals R-Y and B-Y output from the color signal processing circuit 9 are controlled for gain in the variable-gain amplifiers 18 and 19, respectively, and supplied to the encoder circuit 13.

The luminance signal Y output from the separating circuit 8 and the color-difference signals R-Y and B-Y output from the color signal processing circuit 9 are supplied to the object extraction circuit 3, and therein, a specific-object signal is extracted in the same manner as in the embodiment shown in FIG. 3. The specific-object signal is supplied to the microcomputer 16 of the controlling circuit 4 and the microcomputer 16, in response to the specific-object signal, controls the gains in the variable-gain amplifiers 17 to 19. Thus, the signal quantities of the luminance signal and color-difference signals R-Y and B-Y are controlled corresponding to the specific-object signal, and thereby, such effects on the screen can be obtained that the color of the targeted specific object is changed, the signal level of the targeted specific object is changed, and the signal level of a portion other than the targeted specific object is changed, irrespective of such conditions as illuminance.

Figure 5:
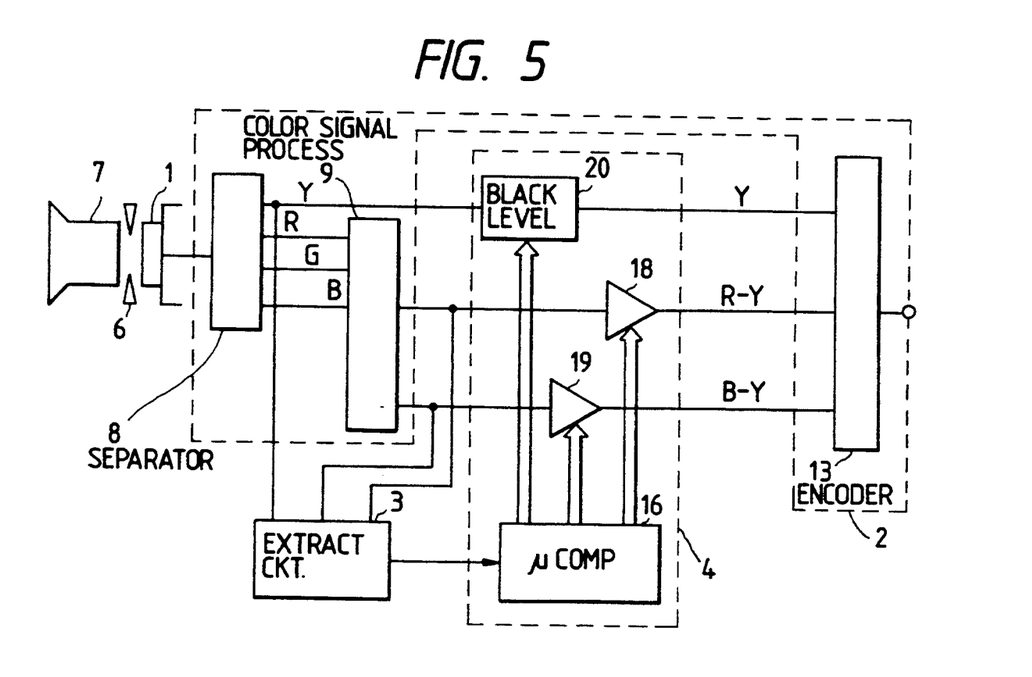
FIG. 5 is a block diagram showing a further embodiment of a video camera according to the present invention.

FIG. 5 is a block diagram showing a further embodiment of a video camera according to the present invention, in which black level setting circuit 20 is utilized in place of the variable-gain amplifier. In FIG. 5, the signal processing circuit 2 comprises the same parts as the signal processing circuit 2 in FIG. 4, but the controlling circuit 4 uses the black-level setting circuit 20 instead of the variable-gain amplifier 17 in the controlling circuit 4 in FIG. 4. The luminance signal Y output from the separating circuit 8 is adjusted for black level in the black-level setting circuit 20 under the control of the microcomputer 16 in accordance with the specific-object signal from the object extraction circuit and then supplied to the encoder circuit 13. The other portions of the circuit arrangement than that described operate in the same manner as in the embodiment shown in FIG. 4. Thus, the black level of the luminance signal Y and signal quantities of the color-difference signals R-Y and B-Y are controlled in accordance with the specific-object signal, whereby, in addition to the effects obtained in the embodiment shown in FIG. 4, an effect of fading the targeted specific object to white on the screen can be obtained irrespective of such conditions as illuminance.

Figure 6:
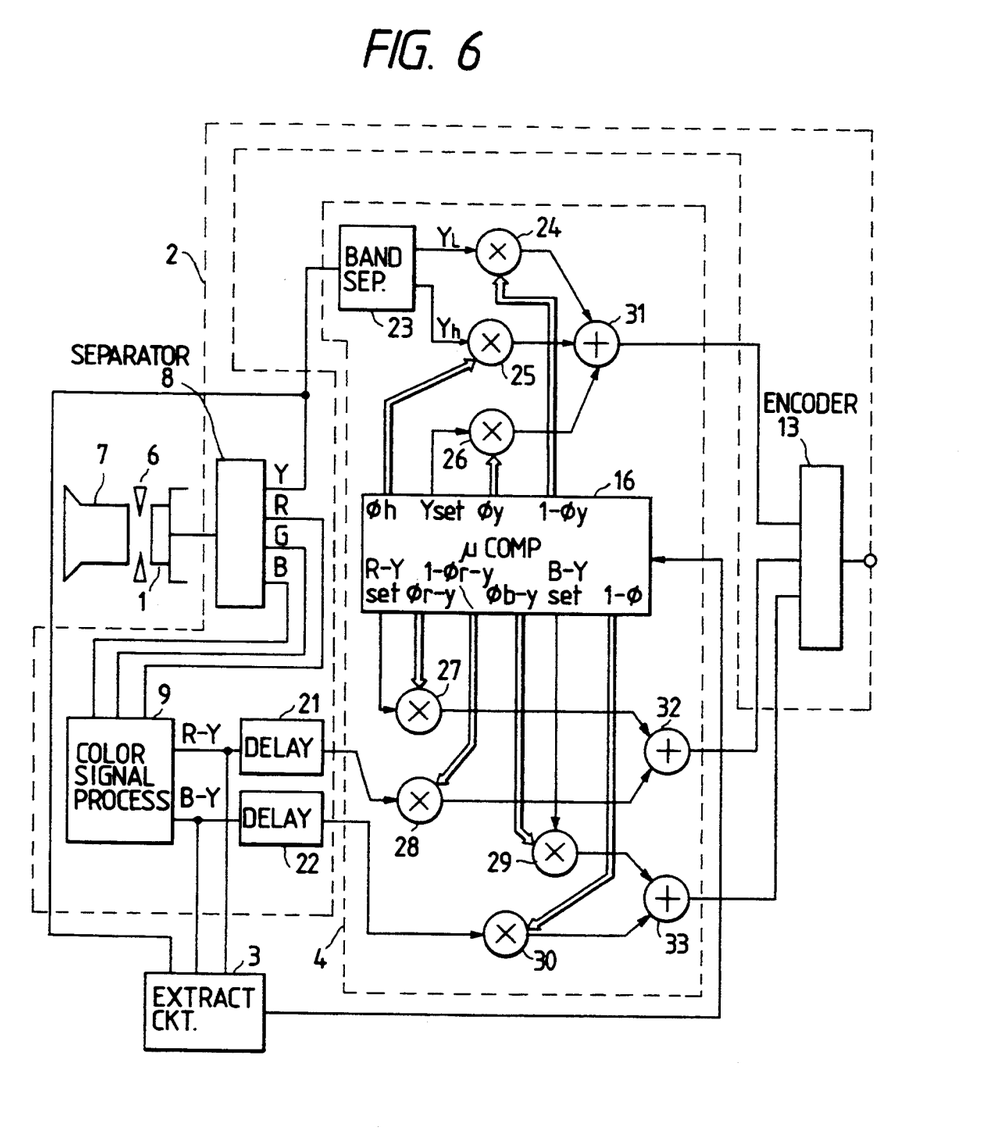
FIG. 6 is a block diagram showing a still further embodiment of the video camera according to the present invention.

FIG. 6 is a block diagram showing a still further embodiment of the video camera according to the present invention, in which reference numerals 21 and 22 denote delay circuits, 23 denotes a band separating circuit, 24 to 30 denote multipliers, and 31 to 33 denote adders. In FIG. 6, the signal processing circuit 2 comprises the separating circuit 8, color signal processing circuit 9, encoder circuit 13, and delay circuits 21 and 22 and the controlling circuit 4 comprises the microcomputer 16, band separating circuit 23, multipliers 24 to 30, and adders 31 to 33. The luminance signal Y output from the separating circuit 8 is supplied to the band separating circuit 23 of the controlling circuit 4, while the color-difference signals R-Y and B--Y output from the color signal processing circuit 9 are delayed by the delay circuit 21 and 22 and supplied to the multipliers 28 and 30, respectively. In the band separating circuit 23, the luminance signal Y is separated into a low-frequency luminance signal YL and a high-frequency luminance signal YH and supplied to the multipliers 24 and 25, respectively. In the multiplier 24, the low frequency luminance signal YL is multiplied by a coefficient $(1-\phi Y)$ output from the microcomputer 16, while, in the multiplier 25, the high- frequency luminance signal YH is multiplied by a coefficient $\phi h$ output from the microcomputer 16. A coefficient $\phi Y$ and a signal Y set are output from the microcomputer 16 and multiplied together in the multiplier 26. Output signals from the multipliers 24, 25, and 26 are added together in the adder 31 and supplied to the encoder circuit 13.

In the multiplier 28, the color-difference signal R-Y is multiplied by a coefficient $(1-\phi r-Y)$ output from the microcomputer 16, while, in the multiplier 30, the color-difference signal B-Y is multiplied by a coefficient $(1-\phi b-Y)$ output from the microcomputer 16. A coefficient $\phi r -Y$ and a signal R-Yset are output from the microcomputer 16 and multiplied together in the multiplier 27, and, further, a coefficient $\phi b - Y$ and a signal B - Yset are output from the microcomputer 16 and multiplied together in the multiplier 29. Output signals from the multipliers 27 and 28 are added in the adder 32, while output signals from the multipliers 29 and 30 are added in the adder 33, and both sum signals are supplied to the encoder circuit 13.

Thus, the low-frequency luminance signal YL and the high-frequency luminance signal YH are changed in signal quantity by the coefficients $(1-\phi Y)$ and $\phi h$, respectively, and the color-difference signal R-Y and the color-difference signal B-Y are changed in signal quantity by the coefficients $(1-\phi r-Y)$ and $(1-\phi b-Y)$, respectively. The microcomputer 16, in response to the specific-object signal from the object extraction circuit 3, controls these coefficients $(1-\phi Y)$, $\phi h$, $(1-\phi r-Y)$, and $(1-\phi b-Y)$. Accordingly, the low-frequency luminance signal YL, high-frequency luminance signal YH, color-difference signal R-Y, and color-difference signal B-Y are changed in signal quantity according to the specific-object signal. Further, since the output signals of the multipliers 24 to 26 are added in the adder 31, it follows that the ratio of combination of the low-frequency luminance signal YL, high-frequency luminance signal YH, and signal Yset are controlled according to the specific-object signal. Further, the output signals of the multipliers 27 and 28 are added together in the adder 32 and the output signals of the multipliers 29 and 30 are added together in the adder 33. Hence, it follows that the ratio of combination of the color-difference signal R-Y and the signal R-Yset and the ratio of combination of the color-difference signal B-Y and the signal B-Yset both are controlled according to the specific-object signal.

Therefore, according to the present embodiment, the frequency characteristic can be changed between the targeted specific object and portions other than the targeted specific object by changing the ratio of combination of the low-frequency luminance signal YL and the high-frequency luminance signal YH according to the specific-object signal, and the signal quantity can be changed between the targeted specific object and the portions other than that by changing the ratio of combination of the low-frequency luminance signal YL, the high-frequency luminance signal YH, and the signal Yset according to the specific-object signal. Further, colors can be changed between the targeted specific object and the portions other than that by changing both the ratio of combination of the color-difference signal R-Y and the signal R-Yset and the ratio of combination of the color-difference signal B-Y and the signal B-Yset. As a result, such effects on the screen can be obtained that portions other than the targeted specific object are rendered out of focus, the targeted specific object is rendered out of focus, the targeted specific object is enhanced, the color of the targeted specific object is changed, the color of the targeted specific object is changed from portions other than that, the signal level of the targeted specific object is changed, and the targeted specific object is faded to white, irrespective of such conditions as illuminance.

Figure 7:
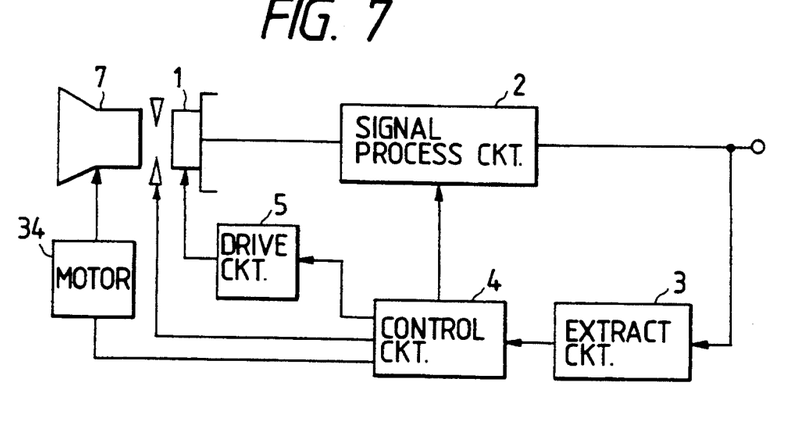
FIG. 7 is a block diagram showing a still further embodiment of a video camera of the present invention.

FIG. 7 is a block diagram showing a still further embodiment of a video camera of the present invention, in which reference numeral 34 denotes a motor. In FIG. 7, the object extraction circuit 3 extracts a specific-object signal representing a specific object such as a person from a video signal output from the signal processing circuit 2 and calculates the focus voltage corresponding to the in-focus condition for each field using the high-frequency component of the extracted signal. The controlling circuit 4, responding to the focus voltage, controls the motor 34 to move the lens 7 in the direction such that the focus voltage increases as the lens 7 moves and to stop the lens 7 at a point where the focus voltage reaches its maximum.

In the present embodiment as described above, the high-frequency component of the video signal is detected only from the extracted specific-object portion and the control for bringing the specific object into focus is thereby executed. Therefore, the focusing accuracy in the automatic focusing can be much improved. Further, a zoom lens may be used for the lens 7 and the zoom lens may be arranged to be driven by the motor 34. Where, however, a specific object such as the face of a person is detected by the object extraction circuit 3 and information about its position, size, etc. is supplied to the controlling circuit 4, then, the controlling circuit 4 will control the zoom ratio so that the size of the specific object may be kept virtually constant. By the described arrangement, automatic control can be obtained such that the size on the screen of the specific object is kept virtually constant according to the extracted information of the specific object even when the specific object moves toward or away from the camera while shooting a scene and thereby a stabilized shooting can be performed.

Figure 8:
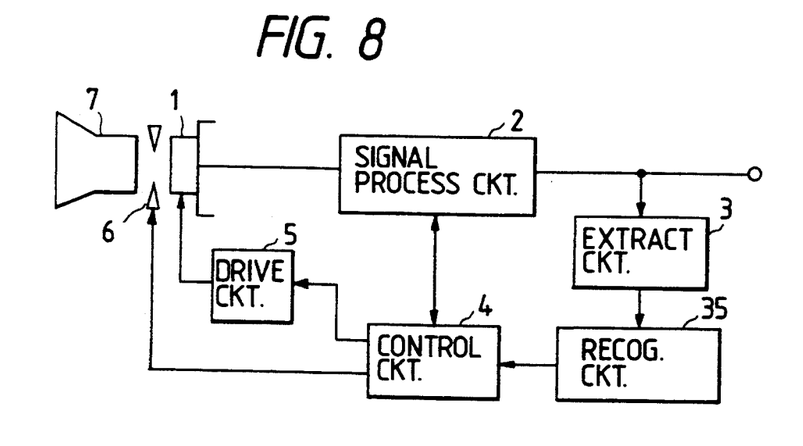
FIG. 8 is a block diagram showing a still further embodiment of a video camera according to the present invention.

FIG. 8 is a block diagram showing a still further embodiment of a video camera according to the present invention, in which reference numeral 35 denotes an object recognition circuit 35 is provided. In FIG. 8, the object extraction circuit 3 extracts characteristics of a specific object from the luminance signal and color signals supplied from the signal processing circuit 2. The characteristics that are extracted include, other than the position of the object on the screen, the hue, saturation, motion vector, etc. to be extracted from the level of the luminance signal and the color signals. From these characteristics, the shape of the specific object and similar characteristics are also calculated. Using such characteristics, the object recognition circuit 35 recognizes what the specific object is. The specific object as the object of recognition includes, other than a person or group of people which are most generally considered the object of a video camera, sky, trees, and the like. The controlling circuit 4, according to the specific object obtained from the object recognition circuit 35 as well as the conditions of color temperature, illuminance, etc., controls the white balance adjustment as well as the electronic shutter, iris stop, zoom ratio, etc.

The object extraction circuit 3 extracts characteristic vectors from the input picture image and transfers the characteristic vectors to the object recognition circuit 35. The object recognition circuit 35 includes, for example, a microcomputer and determines the specific object by analyzing the incoming characteristic vectors. As to the method for recognizing an object through the use of characteristic vectors extracted from a picture image, there have been proposed many types of algorithms, as described, for example, in the Handbook on Artificial Intelligence, published by Ohm Company, 1990, pp. 312–400. Using such an algorithm, the recognition in the present embodiment may be performed.

The white balance adjustment based on the results of recognition of the specific object in the present embodiment will now be described. The controlling circuit 4 controls the signal processing circuit 2 to perform most suitable processing corresponding to the extracted object. Here, the controlling circuit 4 is constructed as shown in FIG. 4 and, when, for example, a person is recognized as the specific object, performs the white balance compensation by setting the color signal gain so that the color of skin does not become pale. When shooting a scene in the evening, the white balance compensation is lowered in degree. The data for the white balance adjustment according to the specific object or the scene, that is, the gains in the amplifiers, are supplied from the microcomputer 16 (FIG. 4) according to the output of the object extraction circuit 3.

Figure 9:
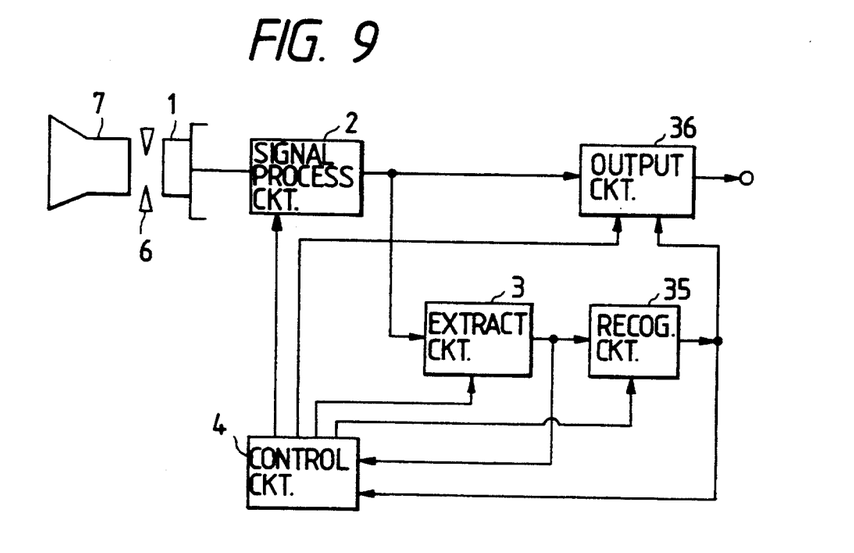
FIG. 9 is a block diagram showing a still further embodiment of a video camera according to the present invention.

FIG. 9 is a block diagram showing a still further embodiment of a video camera according to the present invention representing a variation of FIG. 8, for example, in which reference numeral 36 denotes an output circuit. In FIG. 9, the video signal output from the signal processing circuit 2 is supplied to the object extraction circuit 3 and also supplied to the output circuit 36. The object recognition circuit 35 recognizes what the object is according to the size, shape, position, movement, color, etc. of the specific object extracted by the object extraction circuit 3 and supplies the result of recognition to the output circuit 36. The output circuit 36 superposes the result of recognition on the video signal delivered from the signal processing circuit 2 in the form of wordage, voice, characters, video image, sign, or the like, and outputs the signal to the outside. Of course, the output circuit 36 can output only the result of recognition in the form as described above to the outside. The result of recognition output to the outside can be recorded together with the video signal or recorded alone in a recording medium, or the recorded result of recognition can be used as a means for index, for example, when the recording medium is edited.

Further, the controlling circuit 4 controls the signal processing circuit 2, object extraction circuit 3, object recognition circuit 35, and output circuit 36 depending not only on the result of extraction by the object extraction circuit 3 but also on the result of recognition by the object recognition circuit 35. More specifically, the controlling circuit 4 recognizes what the extracted specific object is depending on the result of extraction by the object extraction circuit 3 and the result of recognition by the object recognition circuit 35, and thereby decides whether or not it is the targeted specific object, and according to this decision, the controlling circuit 4 can set up again the condition for extraction in the object extraction circuit 3. Therefore, the accuracy in extraction of the targeted specific object can be improved.

In the present embodiment, it is recognized what the targeted specific object is, and such functions to be exhibited on the screen as to render a portion other than the specific object out of focus, to render the portion of the targeted specific object out of focus, to render the portion other than the targeted specific object and the portion of the specific object out of focus in desired different degrees, to enhance the targeted specific object, and to change the color of the targeted specific object can be automatically selected by the controlling circuit 4 according to the result of recognition and, further, the outputting of the result of extraction can be automatically set up.

Figure 10:
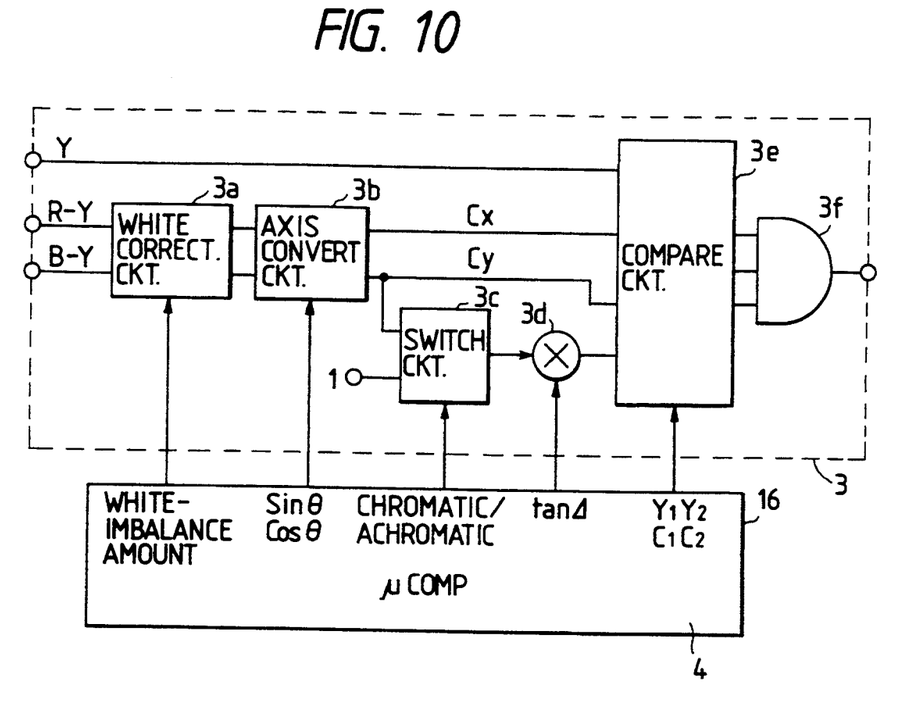
FIG. 10 is a block diagram showing a particular example of an object extraction circuit.
Figure 11:
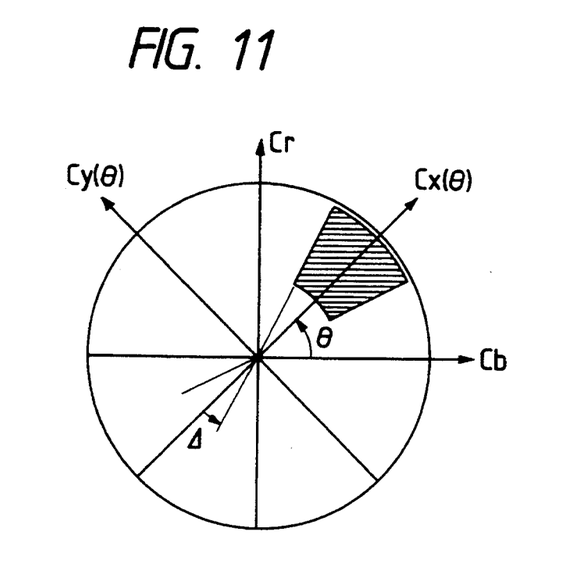
FIG. 11 is a diagram showing extracting operation in the object extraction circuit of FIG. 10.

A particular example of the object extraction circuit 3 used in the above described embodiments will now be described with reference to FIG. 10 and FIG. 11, in which as shown in FIG. 10, the object extraction circuit 3 comprises a white correction circuit 3a, an axis conversion circuit 3b, a switching circuit 3c, a multiplier 3d, a comparison unit 3e, and an AND gate 3f. The luminance signal Y delivered from the signal processing circuit 2 (for example, as shown in FIG. 3) is supplied to the comparison unit 3e, while the color-difference signals R-Y and B-Y are supplied to the white correction circuit 3a. In the white correction circuit 3a, the color-difference signals R-Y and B-Y are corrected by being controlled according to a white-imbalance amount delivered from the microcomputer 16 of the controlling circuit 4, and thereby each color signal is provided with most suitable white correction. The color-difference signals R-Y and B-Y output from the white correction circuit 3a are subjected to axis conversion in the axis conversion circuit 3b according to an axis conversion amount delivered from the microcomputer 16. When the color-difference signals R-Y and B--Y output from the white correction circuit 3a are represented by Cr and Cb, respectively, and the color-difference signals R-Y and B-Y output from the axis conversion circuit 3b are represented by Cx and Cy, respectively, the Cx and Cy are expressed as follows:

$$Cx(\theta) = Cr \cdot \sin \theta + Cb \cdot \cos \theta \quad (1)$$

$$Cy(\theta) = Cr \cdot \cos \theta - Cb \cdot \sin \theta \quad (2)$$

The angle $\theta$ is changed according to the axis conversion amount delivered from the microcomputer 16.

The color-difference signals Cx and Cy output from the axis conversion circuit 3b are supplied to the comparison unit 3e and, therein, the color-difference signals Cx and Cy and the luminance signal Y are compared with comparison conditions delivered from the microcomputer 16. Such comparison conditions can be automatically set up according to the specific object such that Y1 is compared with the luminance signal Y and C1 is compared with the color-difference signals Cx and Cy, or Y2 is compared with the luminance signal Y and C2 is compared with the color-difference signals Cx and Cy, or the conditions can be arbitrarily set up from the outside. The comparison means 3e outputs signals when the luminance signal Y and the color-difference signals Cx and Cy respectively satisfy the comparison conditions. These signals are supplied to the AND gate 3f and therefrom a signal indicative of the period during which the luminance signal Y and the color-difference signals Cx and Cy simultaneously satisfy the respective comparison conditions is output and this signal serves as the desired specific-object signal.

The color-difference signals Cx and Cy output from the axis conversion circuit 3b are also supplied to the switching circuit 3c. The switching circuit 3c switches the extraction conditions in the object extraction circuit 3 depending on whether the specific object has chromatic colors or achromatic colors. Namely, under the control of the microcomputer 16, it selects the color-difference signals Cx and Cy output from the axis conversion circuit 3b when the specific object has chromatic colors, while when the specific object has achromatic colors, it selects a constant 1. The output signal from the switching circuit 3c is supplied to the multiplier 3d, wherein the signal is multiplied by a multiplier $\tan\Delta$ which is controlled by the microcomputer 16. When the specific object has chromatic colors, the hatched portion of the sector indicated in FIG. 11 becomes the region to be extracted by means of the multiplier $\tan\Delta$, while when the specific object has achromatic colors, a small region around the center of FIG. 10 becomes the region to be extracted. The angle $\Delta$ indicative of the range of extraction of hue (or tint) in the portion of the sector and the range of extraction of color saturation (color density) are defined by the multiplier tanΔ in the multiplier 3d and the action of the comparison means 3e. Thus, extraction of both chromatic and achromatic specific objects can be supported.

Figure 12:
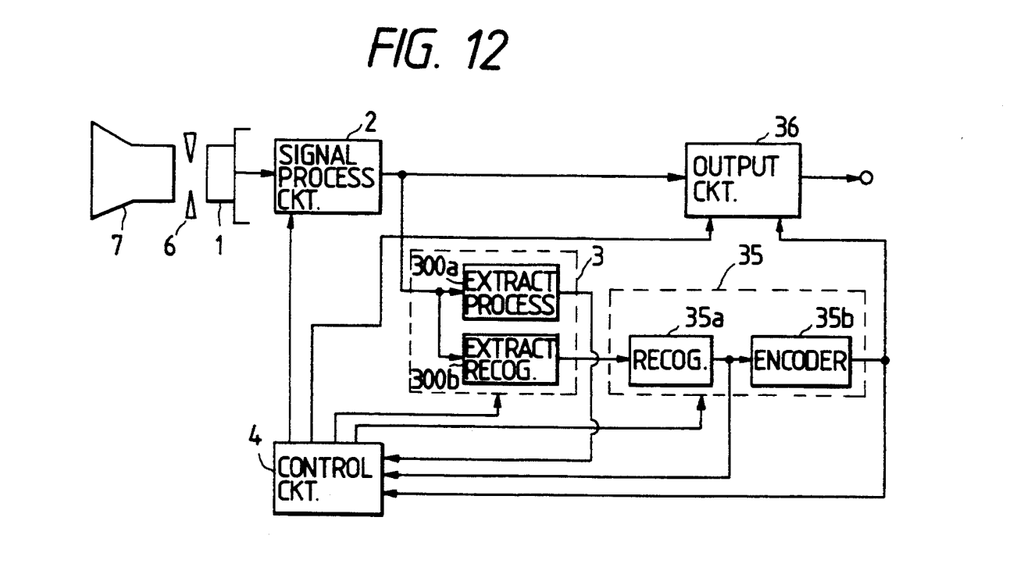
FIG. 12 is a block diagram showing a still further embodiment of a video camera according to the present invention.

FIG. 12 is a block diagram showing a still further embodiment of a video camera according to the present invention, in which the object extraction circuit includes an extraction circuit 300a for processing and an extraction circuit 300b for recognition and the object recognition circuit 35 includes a recognition circuit 35a, and an encoding circuit 35b. In FIG. 12, the extraction circuit 300a for processing processes the specific-object signal so as to become processable in the controlling circuit 4, and the extraction circuit 300b for recognition processes the specific-object signal so as to become processable in the object recognition circuit 35. The object recognition circuit 35 includes a recognition circuit 35a serves for recognizing the object and an encoding circuit 35b serves for encoding the result of recognition. In the object extraction circuit 3, the extraction circuit 300a for processing delivers its output signal to the controlling circuit 4 and the extraction circuit 300b for recognition delivers its output signal to the object recognition circuit 35. The present embodiment produces the same meritorious effects as produced by the embodiment shown in FIG. 9.

Figure 13:
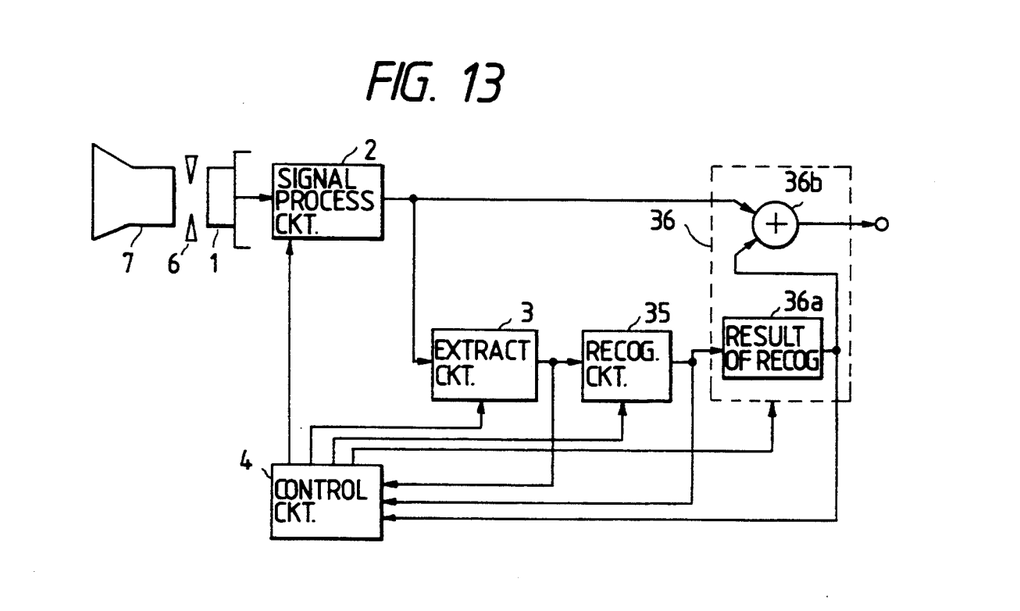
FIG. 13 is a block diagram showing a still further embodiment of a video camera according to the present invention.

Further, an embodiment as shown in FIG. 13 has the output circuit 36 as shown in the embodiments in FIG. 8 and FIG. 12, for example, comprised of a result-of-recognition output circuit 36a for outputting the result of recognition from the object recognition circuit 35 and an adder 36b for adding the result of recognition from the result-of-recognition output circuit 36a and the video signal from the signal processing circuit 2, and thereby, the result of recognition from the result-of-recognition output circuit 36a is also supplied to the controlling circuit 4. This embodiment produces the same meritorious effects as obtained in the embodiments shown in FIG. 9 and FIG. 12.

According to the present invention, a specific object is extracted and picture quality control of the specific object and a portion other than that can be performed separately. Therefore, various picture quality adjustment performances, such as to produce a portrait in which the background is rendered out of focus and to compensate for colors of a specific object to thereby make the specific object look more beautiful, can be simply achieved irrespective of such conditions as illuminance. Further, a specific object can be recognized and ideal picture quality control can be performed according to a specific object or a shot scene. Therefore, automatic functions such as automatic white balancing and automatic focusing functions can be improved and hence an intelligent video camera can be realized.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A video camera comprising:
    means including an image pickup device and a signal processing circuit responsive thereto for processing the image picked up by the image pickup device and providing a video signal as an output;
    extraction means for extracting a signal representative of a specific portion of a target object of the video signal of the signal processing circuit irrespective of movement of the target object within the picked up image; and
    control means responsive to the signal extracted by the extraction means for effecting control of at least one of the signal processing circuit and at least one input control parameter of the video camera in accordance therewith.

2. A video camera according to claim 1, wherein the signal processing circuit includes signal processing parameter means for controlling parameters of the processed video signal including at least one of degree of sharpness, frequency characteristic, signal level, white balance, degree of saturation and hue of a color signal thereof, the control means controlling the signal processing parameter means.

3. A video camera according to claim 1, wherein the at least one input control parameter of the video camera includes a parameter of at least one of focusing means, shutter means of an electronic shutter, a value of a stop, an iris characteristic, or a zoom ratio, the control means controlling the at least one input control parameter.

4. A video camera according to claim 2, further comprising recognition means for recognizing the specific portion from the specific portion signal extracted by the extraction means, the control means being responsive to the recognition means for effecting control in accordance therewith.

5. A video camera according to claim 4, further comprising output means for outputting a result of recognition of the recognition means.

6. A video camera according to claim 5, wherein at least one of the output means and the recognition means includes means for encoding the result of recognition and the output means includes means for superposing the encoded result of recognition on the video signal.

7. A video camera according to claim 6, wherein the output means output the result of recognition in the form of voice information on the video signal.

8. A video camera according to claim 4, wherein the at least one input control parameter of the video camera includes a parameter of at least one of focusing means, shutter means of an electronic shutter, a value of a stop, an iris characteristic, or a zoom ratio, the control means controlling the at least one input control parameter.

9. A video camera according to claim 8, further comprising recognition means for recognizing the specific portion from the specific portion signal extracted by the extraction means, the control means being responsive to the recognition means for effecting control in accordance therewith.

10. A video camera according to claim 9, further comprising output means for outputting a result of recognition of the recognition means.

11. A video camera according to claim 10, wherein at least one of the output means and the recognition means includes means for encoding the result of recognition and the output means includes means for superposing the encoded result of recognition on the video signal.

12. A video camera according to claim 11, wherein the output means output the result of recognition in the form of voice information on the video signal.

13. A video camera according to claim 1, wherein the extraction means extracts the specific portion of the target object by distinguishing the area on which the video signal coincides with a predetermined condition.

14. A video camera comprising:
 means including an image pickup device and a signal processing circuit responsive thereto for processing the image picked up by the image pickup device and providing a video signal as an output;
 extraction means for extracting a signal representative of a specific portion of the video signal of the signal processing circuit; and
 control means responsive to the signal extracted by the extraction means for effecting control of at least one of the signal processing circuit and at least one input control parameter of the video camera in accordance therewith;
 wherein the control means effects control of at least one of the signal processing circuit and at least one input control parameter of the video camera for a remaining portion of the video signal which is not extracted by the extracting means.

15. A video camera according to claim 14, wherein the control means effects control of at least one of the signal processing circuit and at least one input control parameter of the video camera in response to the signal extracted by the extraction means and effects a different control of at least one of the signal processing circuit and at least one input control parameter of the video camera for the remaining portion of the video signal.

16. A video camera comprising:
 means including an image pickup device and a single processing circuit responsive thereto for processing the image picked up by the image pickup device and providing a video signal as an output;
 extraction means for extracting a signal representative of a specific portion of the video signal of the signal processing circuit;
 control means responsive to the signal extracted by the extraction means for effecting control of at least one of the signal processing circuit and at least one input control parameter of the video camera in accordance therewith; and
 recognition means for recognizing the specific portion from the specific portion signal extracted by the extraction means, the control means being responsive to the recognition means for effecting control in accordance therewith.

17. A video camera according to claim 16, further comprising output means for outputting a result of recognition of the recognition means.

18. A video camera according to claim 17, wherein at least one of the output means and the recognition means includes means for encoding the result of recognition and the output means includes means for superposing the encoded result of recognition on the video signal.

19. A video camera according to claim 18, wherein the output means output the result of recognition in the form of voice information on the video signal.

20. A video camera comprising:
 means including an image pickup device and a signal processing circuit responsive thereto for processing circuit responsive thereto for processing the image picked up by the image pickup device and providing a video signal as an output;
 extraction means for extracting a signal representative of a specific portion of a target object of the video signal of the signal processing circuit and for automatically following the target object to extract the signal representative of the specific portion when the target object moves within the picked up image; and
 control means responsive to the signal extracted by the extraction means for effecting control of at least one of the signal processing circuit and at least one input control parameter of the video camera in accordance therewith.

21. A video camera comprising:
 means including an image pickup device and a signal processing circuit responsive thereto for processing the image picked up by the image pickup device and providing a video signal as an output;
 extraction means for extracting a signal representative of a specific portion of the video signal of the signal processing circuit; and
 control means responsive to the signal extracted by the extraction means for effecting control of at least a zoom control of the video camera in accordance therewith.

22. A video camera comprising:
 means including an image pickup device and a signal processing circuit responsive thereto for processing the image picked up by the image pickup device and providing a video signal as an output;
 extraction means for extracting a signal representative of a specific portion of a target object of the video signal of the signal processing circuit; and
 control means responsive to the signal extracted by the extraction means for controlling at least the signal processing circuit to modify at least one of a frequency characteristic, color, brightness, gain and size of the target object in accordance with the extracted signal.

* * * * *